United States Patent [19]

Serapins et al.

[11] Patent Number: 5,029,966
[45] Date of Patent: Jul. 9, 1991

[54] PLUG PIN RECEIVING AN LWG COAXIALLY AND METHOD OF MANUFACTURING SAME

[75] Inventors: Klaus Serapins, Bergisch Gladbach; Karl-Theo Jostes, Leverkusen, both of Fed. Rep. of Germany

[73] Assignee: U.S. Philips Corp., New York, N.Y.

[21] Appl. No.: 446,514

[22] Filed: Dec. 5, 1989

[30] Foreign Application Priority Data

Dec. 24, 1988 [DE] Fed. Rep. of Germany ....... 3843946

[51] Int. Cl.$^5$ ................................................ G02B 6/36
[52] U.S. Cl. ................................ 350/96.20; 350/96.21
[58] Field of Search ................. 350/96.20, 96.21, 96.22

[56] References Cited

U.S. PATENT DOCUMENTS

| | | | |
|---|---|---|---|
| 4,166,668 | 9/1979 | MacLeod | 350/96.20 |
| 4,289,374 | 9/1981 | Franken et al. | 350/96.20 |
| 4,390,237 | 6/1983 | Marazzi | 350/96.20 |
| 4,695,124 | 9/1987 | Himono et al. | 350/96.20 |
| 4,722,584 | 2/1988 | Kakii et al. | 350/96.20 |
| 4,746,188 | 5/1988 | Löffler | 350/96.20 |
| 4,869,571 | 9/1989 | Hübner et al. | 350/96.20 |

FOREIGN PATENT DOCUMENTS 2938910 4/1980 Fed. Rep. of Germany .
3436643 4/1986 Fed. Rep. of Germany .

Primary Examiner—John D. Lee
Assistant Examiner—Phan T. Heartney
Attorney, Agent, or Firm—Ernestine C. Bartlett

[57] ABSTRACT

The invention relates to a plug pin which receives an LWG coaxially and which consists of a hard basic material having a low coefficient of thermal expansion. An accurate working of the convex surface of the plug pin is possible without any problems in that its outer convex surface is provided on at least a part of its length with a coating, having a thickness of less than 300 μm, in particular less than 150 μm, of a material which can be subjected to a chipping treatment better than the basic material.

9 Claims, 1 Drawing Sheet

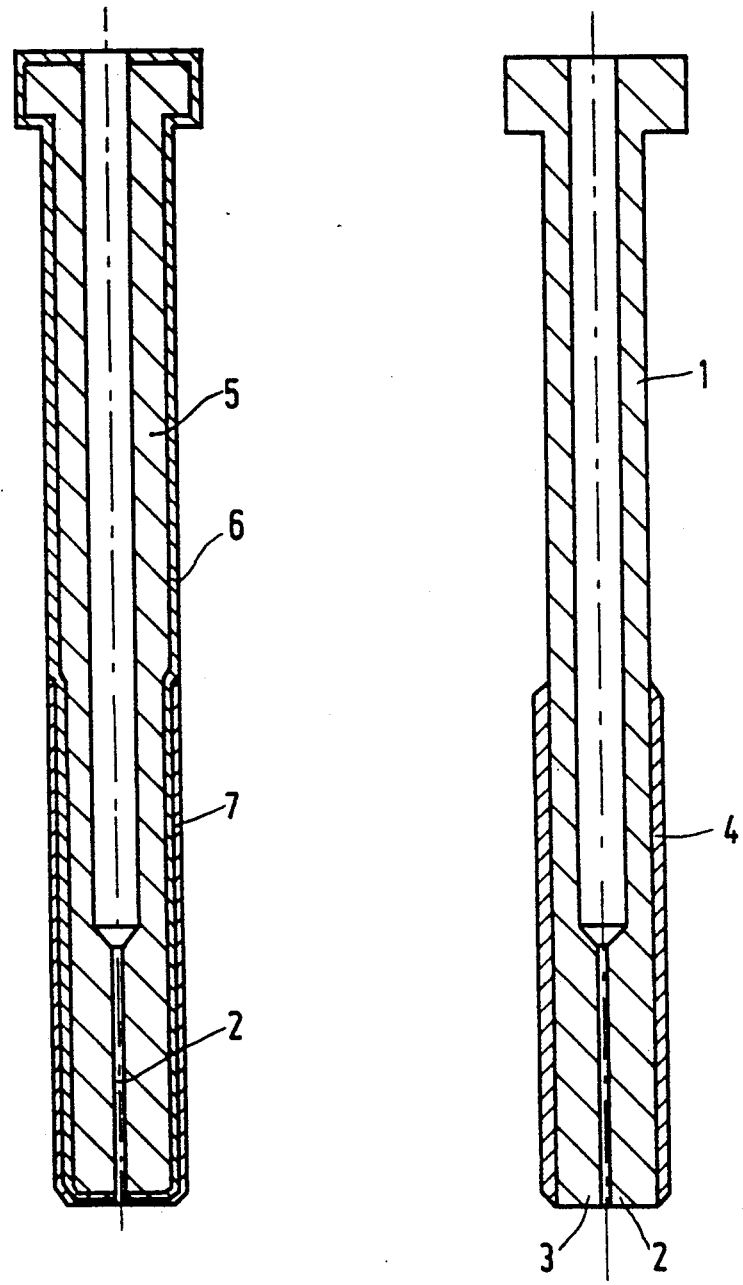

PLUG PIN RECEIVING AN LWG COAXIALLY AND METHOD OF MANUFACTURING SAME

FIELD OF THE INVENTION

The invention relates to a plug pin receiving a light wave guide (LWG) coaxially, which pin consists of a hard basic material having a low coefficient of thermal expansion.

BACKGROUND OF THE INVENTION

Such plug pins are known, for example, from DE-A No. 3436634.

Highest requirements are imposed on the accuracy of the surface quality of a plug pin and on the coaxiality of its convex surface to the optical axis of an introduced LWG, in particular in plug connections for monomode LWG. Tolerance deviations of 100 nm should not be exceeded.

This applies in particular to such plug connections in which the light-emanating surfaces of the LWG of two plug pins to be coupled are situated directly opposite to each other. But also in so-called lens plugs in which the light beam emanating from the end face of the LWG of a plug pin is introduced into the LWG of an opposite plug pin via beam-expanding lenses, the coaxiality of the convex surface of a plug pin to its optical axis must be produced with high accuracy. The required accuracy of the surface quality of a plug pin can be achieved by careful chipping treatments.

It must be possible for plug pins to be inserted into an associated sleeve in a clamp-free manner in a wide temperature range. These requirements can be fulfilled only with materials which have a very low coefficient of thermal expansion, for example, ceramic or hard metal. Additionally the same material should be selected for the plug pin as for the plug sleeve.

However, materials which have a suitably low coefficient of thermal expansion are very hard and difficult to subject to a chipping treatment.

An accurate coaxial alignment of the convex surface of a plug pin to the optical axis of its LWG by a chipping after-treatment can be achieved by means of an optical lathe (compare DE-A No. 2938910 which corresponds substantially to U.S. Pat. No. 4,289,374). However, this precision method is suitable only for soft materials, for example, German silver or copper, which have a very high coefficient of thermal expansion or tend to corrode.

SUMMARY OF THE INVENTION

An object of the invention is to construct a plug pin of the type mentioned in the opening paragraph i.e. of the type receiving an LWG coaxially, which pin consists of a hard basic material having a low coefficient of thermal expansion. Another object is to construct such a pin in such a manner that in spite of the use of a hard material having a low coefficient of thermal expansion a chipping after-treatment of its convex surface is possible without any problems.

These and other objects are achieved in that the outer convex surface of the plug pin is provided at least over a part of its length with a coating, having a thickness of less than 300 μm, in particular less than 150 μm, of a material which can better be subjected to a chipping treatment than the basic material.

Basic bodies of a material having a suitable low coefficient of thermal expansion are manufactured with a small undersize in the area with which they are to be introduced into a plug sleeve and are then coated with a material which can readily be worked. The coating first occurs with an oversize so that after providing the lightwave guide the desired nominal size can be manufactured by a chipping treatment. The coatings may be provided by means of various deposition methods, for example, electrodeposition, chemical deposition, flame spraying, sputtering, evaporation or CVD-like methods (reactive deposition from the gaseous phase).

An electrodeposition with nickel is to be preferred. It has been found that thin layers provided by deposition, in particular nickel layers, exhibit better properties for plug pins than solid bodies consisting of the same material. A thermal after-treatment may in this respect be advantageous.

The coatings adhere very readily in the whole storage and operating temperature range from approximately −50° C. to +100° C. The thermal expansion of the plug pin is determined substantially only by the basic material since the coatings are substantially negligibly thin with respect to the thermal expansion. In the manufacture of the basic bodies no high mechanical precision is required. The coating is provided with a uniform thickness on all sides on the basic body in the deposition process. The layer thicknesses can be adjusted within wide limits from a few nm to a few 100 μm.

The coating can be carried out simultaneously for a considerable number of basic bodies so that plug pins built up according to the invention are excellently suitable for a large series production.

In a preferred embodiment it is ensured that the basic body of the plug pin consisting of a hard basic material comprises two longitudinal areas with different diameters, that a first coating is provided on both longitudinal areas, and that preferably on the front longitudinal area which has a smaller diameter an additional second coating is provided.

The first coating may be carried out, for example, in the form of a Cu layer which is as thin as possible (a few μm thick). This Cu layer may be provided on the whole circuit of the basic body and form a corrosion-protecting layer for a non-corrosion resistant basic body. Moreover, the said Cu layer can significantly improve the bonding of an overlying thicker nickel layer.

The preferred method of manufacturing a plug pin according to the invention is characterized in that the plug pin is manufactured from a hard basic body the outside diameter of which has a small undersize of less than 300 μm with respect to the nominal diameter of the plug pin, and that at least one layer of a material which can better be worked is then provided the thickness of which is larger than half the undersize, and that finally the nominal diameter is produced by a chipping treatement. The chipping treatment is preferably carried out by means of a so-called optical lathe in which the axis of rotation of the plug pin is aligned to the optical axis of an inserted LWG so that the convex surface can very accurately be worked coaxially to the optical axis of the LWG.

BRIEF DESCRIPTION OF THE DRAWINGS

FIG. 1 is a longitudinal sectional view through a first embodiment of a plug pin according to the invention, FIG. 2 is a longitudinal sectional view of a second embodiment of a plug pin according to the invention.

DETAILED DESCRIPTION OF PREFERRED EMBODIMENTS

The invention will now be described in greater detail with reference to the description of embodiments shown in the drawing.

The plug pins shown in the Figures are to receive an LWG, not shown, in the narrow capillary bores 2 of the basic bodies 1 and 5, respectively. An LWG is preferably glued in. The area in question of the LWG may additionally be provided with a thin encasing tube, for example, a glass capillary.

The outside diameter of the basic bodies 1 and 5, respectively, are smaller than the nominal diameters of the plug pin which is, for example, 3.5 mm.

In the FIG. 1 embodiment the nominal diameter is achieved by the electrodeposited nickel layer 4 which is shown exaggeratedly thick. In fact it has a layer thickness of only approximately 50 $\mu$m to 100 $\mu$m.

In FIG. 2 the whole surface of the basic body 5 is provided with a first coating 6 which is preferably very thin. A second coating 7 is provided only in the front area in which the basic body 5 is manufactured with a reduced diameter. The first coating preferably also serves as a corrosion-protecting layer and may constitute a bonding intermediate layer (for example, copper) for the next second layer 7 of nickel.

First the basic bodies 1 and 5, respectively, are manufactured with undersize. Layers 4 and 6, 7, respectively, are then deposited in such a thickness that an oversize with respect to the desired size of the plug pin is obtained. The end area of an LWG is then glued in the capillary bore 2 and ground flush with the end face 3. Finally the desired size of the outside diameter of the plug pin is then produced by an after-treatment by means of a so-called optical lathe (for example as described in DE-A No. 2938910 and U.S. Pat. No. 4,289,374) in which the outer convex surface, at least in the front area, extends very accurately coaxially to the optical axis of the LWG.

For the basic bodies 1 and 5 blanks of a tungsten solid solution were used which has a coefficient of thermal expansion of $6 \times 10^{-6} K^{-1}$. The outside diameter in the area operating as a plug pin was approximately 2.4 mm. A nickel layer of 100 $\mu$m was then electrodeposited. The electrodeposited nickel showed a structure which could particularly be readily worked. In the subsequent treatment roundness values of better than 0.1 $\mu$m and surface roughnesses of also less than 0.1 $\mu$m were then achieved. The working by means of an optical lathe gave excellent values for the central coaxiality of the optical axis of the LWG and of the convex surface of the plug pin.

The plug pins according to the invention show excellent properties in particular in conjunction with a working method by means of the optical lathe. The optical dampings of plug connections manufactured by means of plug pins according to the invention were extremely small.

We claim:

1. A plug pin receiving an LWG coaxially, which pin has an external convex surface and consists of a hard basic material having a low coefficient of thermal expansion, said external convex surface of the plug pin, at least over a part of its length, being provided with a coating having a thickness of less than 300 $\mu$m of a material which can better be subjected to a chipping treatment than the basic material.

2. A plug pin as claimed in claim 1, wherein the basic material is coated with nickel.

3. A plug pin as claimed in claim 2 wherein the basic body of the plug pin which consists of a hard basic material comprises two longitudinal areas of different diameters, a first coating being provided on both longitudinal areas, and an additional second coating being provided on the front longitudinal area which has a smaller diameter.

4. A plug pin as claimed in claim 2, wherein the nickel is electrodeposited in a layer.

5. A plug pin as claimed in claim 4 wherein the basic body of the plug pin which consists of a hard basic material comprises two longitudinal areas of different diameters, a first coating being provided on both longitudinal areas, and an additional second coating being provided on the front longitudinal area which has a smaller diameter.

6. A plug pin as claimed in claim 1, wherein the basic body of the plug pin which consists of a hard basic material comprises two longitudinal areas of different diameters, a first coating being provided on both longitudinal areas, and that an additional second coating being provided on the front longitudinal area which has a smaller diameter.

7. A plug pin as claimed in claim 6, wherein the coatings consist of different materials.

8. A plug pin as claimed in claim 7, wherein the first coating is copper and the second coating is nickel.

9. A method of manufacturing a cylindrical plug pin receiving an LWG coaxially, said plug pin having a coaxial bore, in which method an LWG is inserted in the coaxial bore of the plug pin after which the plug pin is tensioned in an optical lathe in an axis of rotation aligned to the optical axis of the LWG, and the convex surface of the plug pin is subjected to a chipping treatment centrically to the optical axis of the LWG, wherein:

the plug pin is manufactured from a hard basic body (1, 5) the outside diameter of which has a small undersize of less than 30 $\mu$m with respect to the desired diameter of the plug pin;

at least one layer (4, 6, 7) of a material which can better be worked than the basic material is then provided at a thickness which is larger than one-half the undersize; and the desired diameter is produced by a chipping treatment.

* * * * *